United States Patent
Ikeda et al.

(10) Patent No.: US 8,818,668 B2
(45) Date of Patent: Aug. 26, 2014

(54) VEHICLE CONTROL APPARATUS AND VEHICLE CONTROL METHOD

(75) Inventors: Yukihiro Ikeda, Toyota (JP); Kouichi Hara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1514 days.

(21) Appl. No.: 12/065,204

(22) PCT Filed: Aug. 31, 2006

(86) PCT No.: PCT/IB2006/002446
§ 371 (c)(1),
(2), (4) Date: Feb. 28, 2008

(87) PCT Pub. No.: WO2007/026242
PCT Pub. Date: Mar. 8, 2007

(65) Prior Publication Data
US 2008/0221767 A1    Sep. 11, 2008

(30) Foreign Application Priority Data

Sep. 1, 2005  (JP) ................................. 2005-253643

(51) Int. Cl.
*G06F 7/70*   (2006.01)
*B60W 10/18*  (2012.01)
*B60W 10/06*  (2006.01)
*G08G 1/16*   (2006.01)

(52) U.S. Cl.
CPC ............... *B60W 10/06* (2013.01); *B60W 10/18* (2013.01); *B06W 10/10* (2013.01); *G08G 1/167* (2013.01); *G08G 1/168* (2013.01)
USPC ......... 701/70; 701/1; 701/23; 701/28; 701/93

(58) Field of Classification Search
CPC ..... B60W 10/06; B60W 10/18; B60W 10/10; G08G 1/167; G08G 1/168
USPC ............... 701/1, 23, 28, 70, 72, 93, 200, 207, 701/210, 213, 216, 217; 348/148, 149; 340/988
See application file for complete search history.

(56) References Cited

U.S. PATENT DOCUMENTS 6,360,170 B1 * 3/2002 Ishikawa et al. ............... 701/300
6,577,334 B1 * 6/2003 Kawai et al. ................... 348/148
(Continued)

FOREIGN PATENT DOCUMENTS

| EP | 1 052 143 | 11/2000 |
| EP | 1 195 669 | 4/2002 |
| EP | 1 605 404 | 12/2005 |
| JP | 10-44827 | 2/1998 |

(Continued)

*Primary Examiner* — Helal A Algahaim
*Assistant Examiner* — Nga X Nguyen
(74) *Attorney, Agent, or Firm* — Oblon, Spivak, McClelland, Maier & Neustadt, L.L.P.

(57) ABSTRACT

A vehicle control apparatus that performs driving assist control on an entrance ramp or an exit ramp connected to a main road having a different safe cruising speed limit than the entrance ramp or the exit ramp. The control apparatus includes a broken line detecting device that detects a broken line marked on the road and divides the main road and the entrance ramp or the exit ramp and a controller that determines a control zone of the driving assist control based on the broken line detection results from the broken line detecting device. For example, the vehicle control apparatus detects the broken line that divides a main road and an exit ramp using the broken line detecting device and starts driving assist control using the controller when it is detected that an accelerator pedal has been released.

13 Claims, 8 Drawing Sheets

(56) References Cited

U.S. PATENT DOCUMENTS

| | | |
|---|---|---|
| 6,968,266 B2 * | 11/2005 | Ahmed-Zaid et al. .......... 701/96 |
| 2003/0204299 A1 | 10/2003 | Waldis et al. |
| 2007/0091173 A1 * | 4/2007 | Kade et al. .................... 348/119 |
| 2009/0088978 A1 * | 4/2009 | Ishikawa et al. .............. 701/223 |
| 2009/0157286 A1 * | 6/2009 | Saito et al. .................... 701/117 |
| 2010/0246889 A1 * | 9/2010 | Nara et al. .................... 382/104 |
| 2010/0292895 A1 * | 11/2010 | Nakamura et al. .............. 701/41 |
| 2011/0093179 A1 * | 4/2011 | Schofield et al. ............... 701/93 |

FOREIGN PATENT DOCUMENTS

| | | |
|---|---|---|
| JP | 10 141491 | 5/1998 |
| JP | 11-99851 | 4/1999 |
| JP | 2000-105898 | 4/2000 |
| JP | 2001-263479 | 9/2001 |
| JP | 2001-289654 | 10/2001 |
| JP | 2002 312797 | 10/2002 |
| JP | 2004 347470 | 12/2004 |
| JP | 2005-199910 | 7/2005 |

* cited by examiner

VEHICLE CONTROL APPARATUS AND VEHICLE CONTROL METHOD

BACKGROUND OF THE INVENTION

1. Field of the Invention

The invention relates to a vehicle control apparatus and vehicle control method which performs driving assist control on an entrance ramp or exit ramp connected to a main road where the safe cruising speed limit is different than it is on the entrance ramp or the exit ramp.

2. Description of the Related Art Japanese Patent Application Publication No. JP-A-10-141491, for example, includes road information storing means for storing road information, host vehicle position detecting means for detecting the position of the host vehicle on the road, vehicle speed detecting means for detecting the vehicle speed, connecting road detecting means for detecting a connecting road that connects with a road having different attributes from the stored road information, control zone setting means for setting a control zone based on the host vehicle position and the detected connecting road, automatic transmission for select gear ratio automatically, gear ratio regulating means for determining a range into which the gear ratio can be shifted based on the vehicle speed in the control zone, driving operation detecting means for detecting a driving operation by a driver, and gear ratio setting means for setting the gear ratio selected by an automatic transmission to within the determined range based on a predetermined driving operation.

In the foregoing technology, the connecting road is detected from the stored road information and the control zone is set based on the detected host vehicle position and connecting road. As a result, depending on the accuracy of the road information and the detection accuracy of the host vehicle position, the positional relationship between the host vehicle position and the starting and ending points of the connecting road may not be able to be accurately detected. As a result, an accurate control zone may not be able to be set.

SUMMARY OF THE INVENTION

This invention aims to provide a vehicle control apparatus capable of setting an accurate control zone when performing driving assist control on an entrance ramp or an exit ramp that is connected to a main road having a different safe cruising speed limit than the entrance ramp or the exit ramp, as well as to provide a control method of that vehicle control apparatus.

Therefore, a first aspect of the invention relates to a vehicle control apparatus which performs driving assist control on an entrance ramp or an exit ramp connected to a main road having a different safe cruising speed limit than the entrance ramp or the exit ramp. This vehicle control apparatus includes broken line detecting means for detecting a broken line which is marked on the road and divides the main road and the entrance ramp or the exit ramp, and controlling means for determining a control zone of the driving assist control based on a broken line detection result from the broken line detecting means.

Also, in the vehicle control apparatus, the controlling means may start the driving assist control when the broken line detecting means detects the broken line that divides the main road and the exit ramp.

Also, in the vehicle control apparatus, the controlling means may execute the driving assist control when the broken line detecting means detects the broken line that divides the main road and the exit ramp and an accelerator pedal is released.

Further, in the vehicle control apparatus, the controlling means may end the driving assist control when the broken line detecting means detects the broken line that divides the main road and the entrance ramp.

Also, the vehicle control apparatus may further include host vehicle position detecting means for detecting the position of a host vehicle, and a storage device which stores map data including position information of a merging point of the entrance ramp, and the controlling means may end the driving assist control when it can be determined, based on the map data and the host vehicle position detected by the host vehicle position detecting means, that the host vehicle has passed through the merging point, even if the broken line is not detected by the broken line detecting means.

Also in the vehicle control apparatus, the controlling means may determine a starting point or an ending point of the control zone based on the position of the broken line detected by the broken line detecting means.

Also in the vehicle control apparatus, the controlling means may set, as the control zone, a zone extending from the position of the broken line detected by the broken line detecting means to a branching position of a peripheral road and a service road.

Also in the vehicle control apparatus, the controlling means may set, as the control zone, a zone extending from the position of the broken line detected by the broken line detecting means to a position of a gate which divides a ordinary road and a toll road.

Moreover, in the vehicle control apparatus, the controlling means may set, as the control zone, a zone extending from the position of the broken line detected by the broken line detecting means to a midpoint of a service road.

Also, in the vehicle control apparatus, the controlling means may halt or end execution of the driving assist control when an acceleration or deceleration operation by a driver is detected within the control zone.

In the vehicle control apparatus, the broken line detecting means may be imaging means mounted on the vehicle.

Furthermore, in the vehicle control apparatus, the imaging means may be a back camera which is mounted to a rear portion of a vehicle body and captures an image of a road surface.

In the vehicle control apparatus, the broken line detecting means may also detect the broken line over which the vehicle crosses.

The invention makes it possible to achieve a vehicle control apparatus which is able to set an appropriate control zone when performing vehicle assist control on an entrance ramp or an exit ramp connected to a main road having a different safe cruising speed limit than the entrance ramp or the exit ramp.

A second aspect of the invention relates to a vehicle control method for performing driving assist control on an entrance ramp or an exit ramp connected to a main road having a different safe cruising speed limit than the entrance ramp or the exit ramp. This vehicle control method includes the steps of detecting a broken line which is marked on the road and divides the main road and the entrance ramp or the exit ramp, and determining a control zone of the driving assist control based on a broken line detection result.

The invention makes it possible to set an appropriate control zone when performing vehicle assist control on an entrance ramp or an exit ramp connected to a main road having a different safe cruising speed limit than the entrance ramp or the exit ramp.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, example embodiments of the invention will be described with reference to the drawings.

Figure 1:
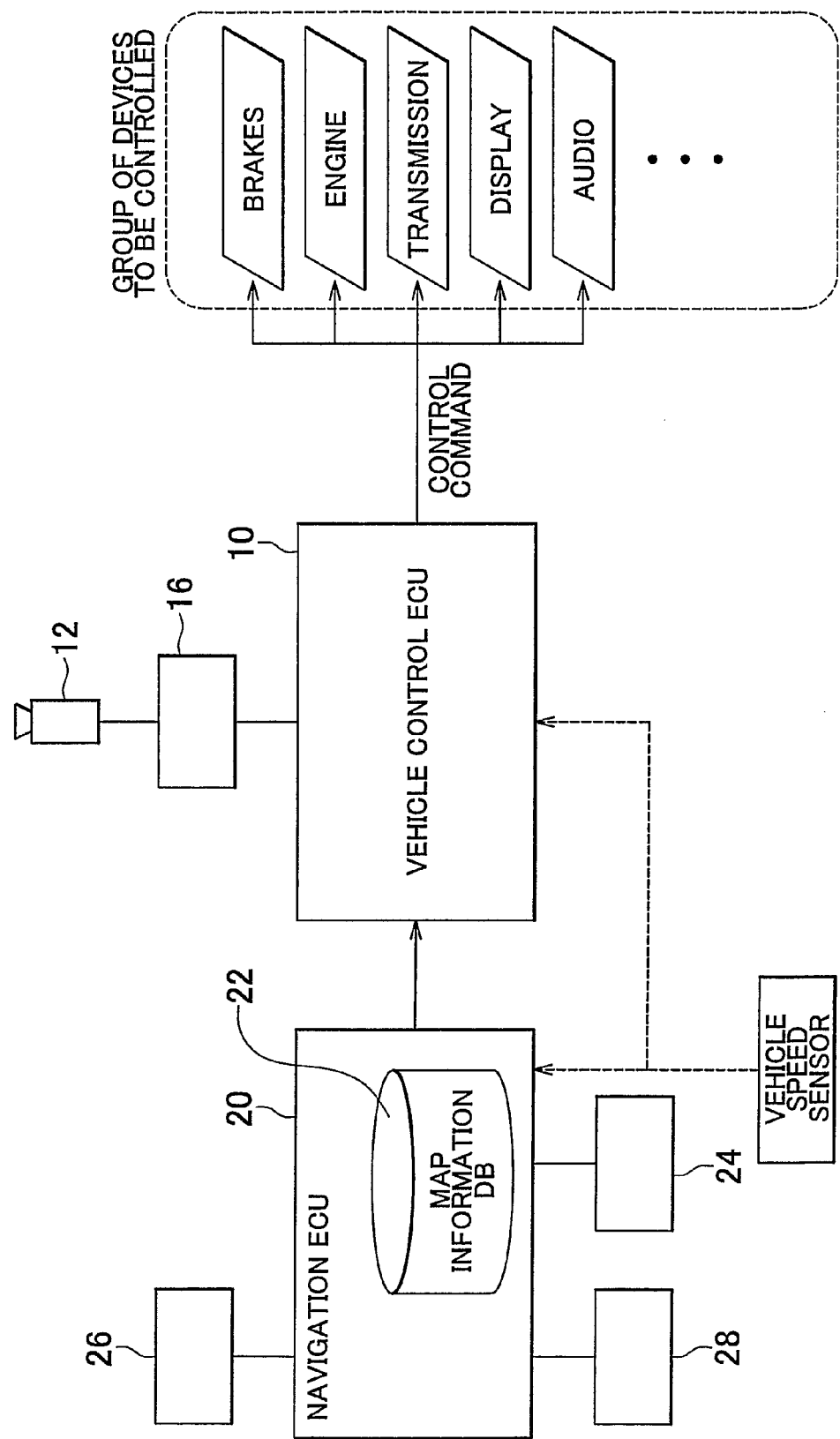
FIG. 1 is a system block view of a vehicle control apparatus according to one example embodiment of the invention.

FIG. 1 is a system block diagram of a vehicle control apparatus according to one example embodiment of the invention. The vehicle control apparatus of this example embodiment is structured around an electronic control unit 10 (hereinafter referred to as "vehicle control ECU 10"). Similar to an ordinary ECU (electronic control unit), the vehicle control ECU 10 is a microcomputer that includes a CPU, ROM, and RAM and the like which are connected together via a bus, not shown.

As will be described in detail below, the vehicle control ECU 10 is a control apparatus which performs driving assist control by identifying an entrance ramp and an exit ramp of a toll road based on image recognition results and map data, to be described later, and outputting various control commands as necessary to various devices to be controlled to enable the vehicle to drive appropriately on the entrance ramp and exit ramp.

The devices to be controlled include not only driving control devices which control the operation of the vehicle, such as the brakes, the engine, and the transmission, but also devices that can function as warning devices, such as indicators, displays, and audio devices. Therefore, the control commands sent from the vehicle control ECU 10 to these devices to be controlled include an acceleration/deceleration assist command for the driving control devices.

Various electronic components (i.e., various ECUs and sensors such as a vehicle speed sensor) in the vehicle, in addition to the control devices described above, are connected via a suitable communication network such as CAN (controller area network) to the vehicle control ECU 10.

The vehicle control ECU 10 obtains various information necessary to perform control, described in detail below, via communication with these various electronic components. For example, some of the various electronic components that provide driving operation information include an accelerator opening amount sensor (accelerator position sensor) that detects the operating state of an accelerator pedal, a shift position sensor that detects the operating position of a shift, a brake stroke sensor (braking force sensor, master cylinder pressure sensor) that detects the operating state of a brake pedal, and a steering sensor that detects the operating state of a steering wheel. Also, some of the various electrical components that provided running state information include a wheel speed sensor that detects the vehicle speed, an acceleration sensor, and a yaw rate sensor.

The vehicle control ECU 10 is also connected to an image processing device which is connected to a back camera 12. The back camera 12 is mounted so that it captures an image facing downward in back of the vehicle, e.g., fixed pointed downward on the back door panel of a back surface of the vehicle. The back camera 12 may be used not only to recognize a broken line, as will be described later, but also for other purposes such as to assist with rearward visibility when parking, for example.

The image processing device 16 operates in response to a broken line recognition command from the vehicle control ECU 10, and detects/recognizes a broken line 70 (see FIG. 4) marked on a road that divides an entrance ramp or exit ramp and a main road, by receiving and processing the captured image from the back camera 12. The broken line 70 has a characteristic pattern at predetermined intervals in the lengthwise direction and so may be detected based on a known characteristic such as, for example, thickness of the line or the intervals between broken lines by pattern matching or the like in the image processing device 16. The detection results of the broken line (i.e., broken line recognition results) from the image processing device 16 are provided to the vehicle control ECU 10. When the image from the back camera 12 contains a broken line 70, it can be determined that the vehicle has crossed over that broken line.

The image processing device 16 also operates in response to a lane recognition command from the vehicle control ECU 10 and detects/recognizes a white line (lane marking) on both sides of the vehicle on the road on which the vehicle is traveling by receiving and processing the image captured by the back camera 12. The detection results of the lane (i.e., lane marking recognition results) from the image processing device 16 are provided to the vehicle control ECU 10.

The vehicle control ECU 10 in this example embodiment is connected to a navigation ECU 20 that realizes the main function of a navigation system. The navigation ECU 20 is formed by a microprocessor that includes a CPU, ROM, RAM, I/O, and the like.

The navigation ECU 20 is connected to various components such as a map information database 22 that stores map data on a medium such as DVD or CD-ROM, a display device 24 such as a liquid crystal display that outputs a map display or road guidance display with an image, and an operation input portion 26 such as a touch panel which serves as a user interface.

The map data stored in the map information data base 22 includes various information similar to ordinary road information, such as coordinate information of each node corresponding to respective merging points/branching points (i.e., points where an entrance ramp merges with a main road and points where an exit ramp branches off from the main road) of a toll road, link information that connects adjacent nodes, road width information of a road corresponding to each link, road type such as national highway, prefectural highway, expressway, and the like corresponding to each link, traffic regulation information of each link, and traffic regulation information between the links. As will be described later on, the position information of the merging points of the entrance ramps and the exit points of the exit ramps may be corrected based on the detection results of the broken lines (i.e., the broken line recognition results) from the image processing device 16, new position information created, and that newly created position information then stored after-the-fact in the map information database. In order to do this, the map information database may include a writable recording medium such as a hard disc.

The navigation ECU 20 includes host vehicle position detecting means 28 for detecting the position of the host vehicle. The host vehicle position detecting means 28 includes a GPS (Global Positioning System) receiver, a beacon receiver and FM multiple receiver, and various sensors such as a vehicle speed sensor and a gyro sensor. The host vehicle position is calculated (at a calculation cycle of 0.1 sec, for example) based on a GPS signal transmitted from a GPS satellite and received by a GPS receiver via a GPS antenna. The positioning method may be any method such as independent positioning and differential positioning (including interferometric positioning), but in this example embodiment, highly accurate differential positioning is used. The host vehicle position at this time may be corrected based on output from the various sensors such as the vehicle speed sensor and the gyro sensor, and various information received via the beacon receiver and the FM multiple receiver. Also, the host vehicle position may also be irregularly corrected appropriately using map data in the map information database 22 according to map matching technology.

The thus obtained host vehicle position is supplied to the vehicle control ECU 10 at each calculation cycle of the vehicle host position. The vehicle control ECU 10 then performs a predetermined driving assist on an entrance ramp and an exit ramp of a toll road based on the broken line recognition results from the image processing device 16 while periodically identifying the host vehicle position based on the supplied host vehicle position information.

Figure 2:
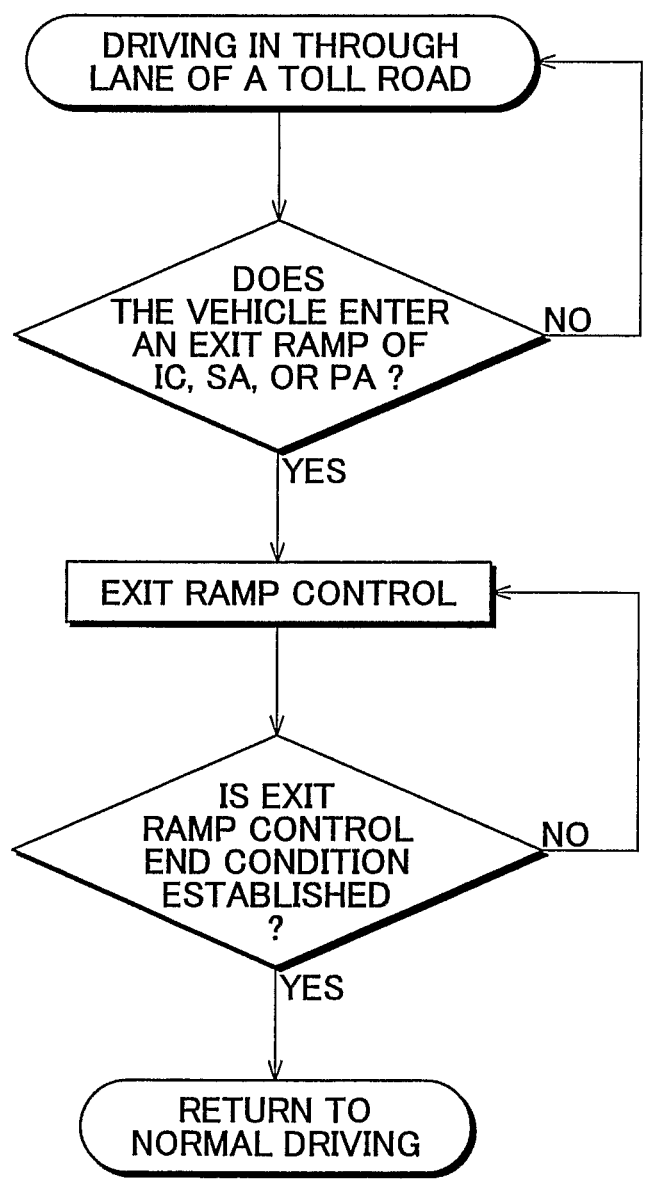
FIG. 2 is a flowchart illustrating an exit ramp control routine executed by a vehicle control ECU.

FIG. 2 is a flowchart illustrating a driving assist control (hereinafter referred to as "exit ramp control") routine on an exit ramp, which is executed by the vehicle control ECU 10.

As shown in FIG. 2, while traveling in a through lane of a toll road, the vehicle control ECU 10 monitors whether the vehicle has entered an exit ramp to an interchange (IC), a service area (SA), or a parking area (PA). When an exit ramp control start condition is satisfied by the vehicle entering an exit ramp to an interchange, service area, or parking area, a predetermined exit ramp control is executed. The exit ramp control ends when an exit ramp control end condition is satisfied, after which the vehicle returns to the normal running state. The exit ramp control start condition and the exit ramp control end condition will be described in detail later.

The exit ramp control is a deceleration assist that is performed to enable the vehicle to travel appropriately on the exit ramp, and may include a warning output that indicates such. The deceleration assist by the driving control apparatus may change the control state of the engine or transmission or the like (i.e., the engine brake range or the shift line) to increase the deceleration performance of the vehicle. Also, the warning by the warning device may be output in a way that urges deceleration. The way in which it is output may be acoustic, visual, tactile (such as by vibration), or other. The exit ramp control may also be made so that the control state (such as the deceleration performance) varies depending on the shape and length of the exit ramp zone, for example.

Figure 3:
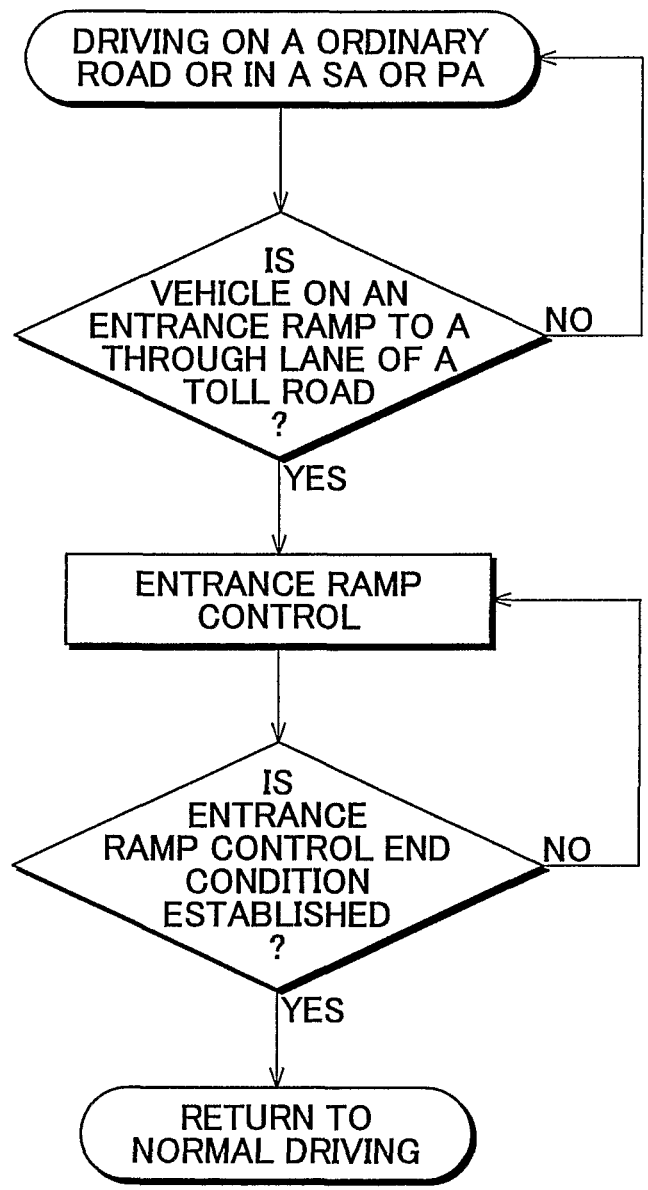
FIG. 3 is a flowchart illustrating an entrance ramp control routine executed by the vehicle control ECU.

FIG. 3 is a flowchart illustrating a driving assist control (hereinafter referred to as "entrance ramp control") routine on an entrance ramp, which is executed by the vehicle control ECU 10.

As shown in FIG. 3, while traveling on a ordinary road or within a service area or parking area, the vehicle control ECU 10 monitors whether the vehicle has entered an entrance ramp to a through lane of a toll road. When an entrance ramp control start condition is satisfied by the vehicle entering the entrance ramp, a predetermined entrance ramp control is executed. The entrance ramp control ends when an entrance ramp control end condition is satisfied, after which the vehicle returns to the normal running state. The entrance ramp control start condition and the entrance ramp control end condition will be described in detail later.

The entrance ramp control is an acceleration assist that is performed to enable the vehicle to travel appropriately on the entrance ramp. The acceleration assist by the driving control apparatus may change the control state of the engine or transmission or the like (i.e., the relationship between the throttle opening amount with respect to the accelerator pedal depression amount, or the shift line) to increase the acceleration performance of the vehicle. The entrance ramp control may also be made so that the control state (such as the acceleration performance) varies depending on the shape and length of the entrance ramp zone, for example.

Several detailed example embodiments will now be described presupposing the basic example embodiment described above.

[First Example Embodiment]

Figure 4:
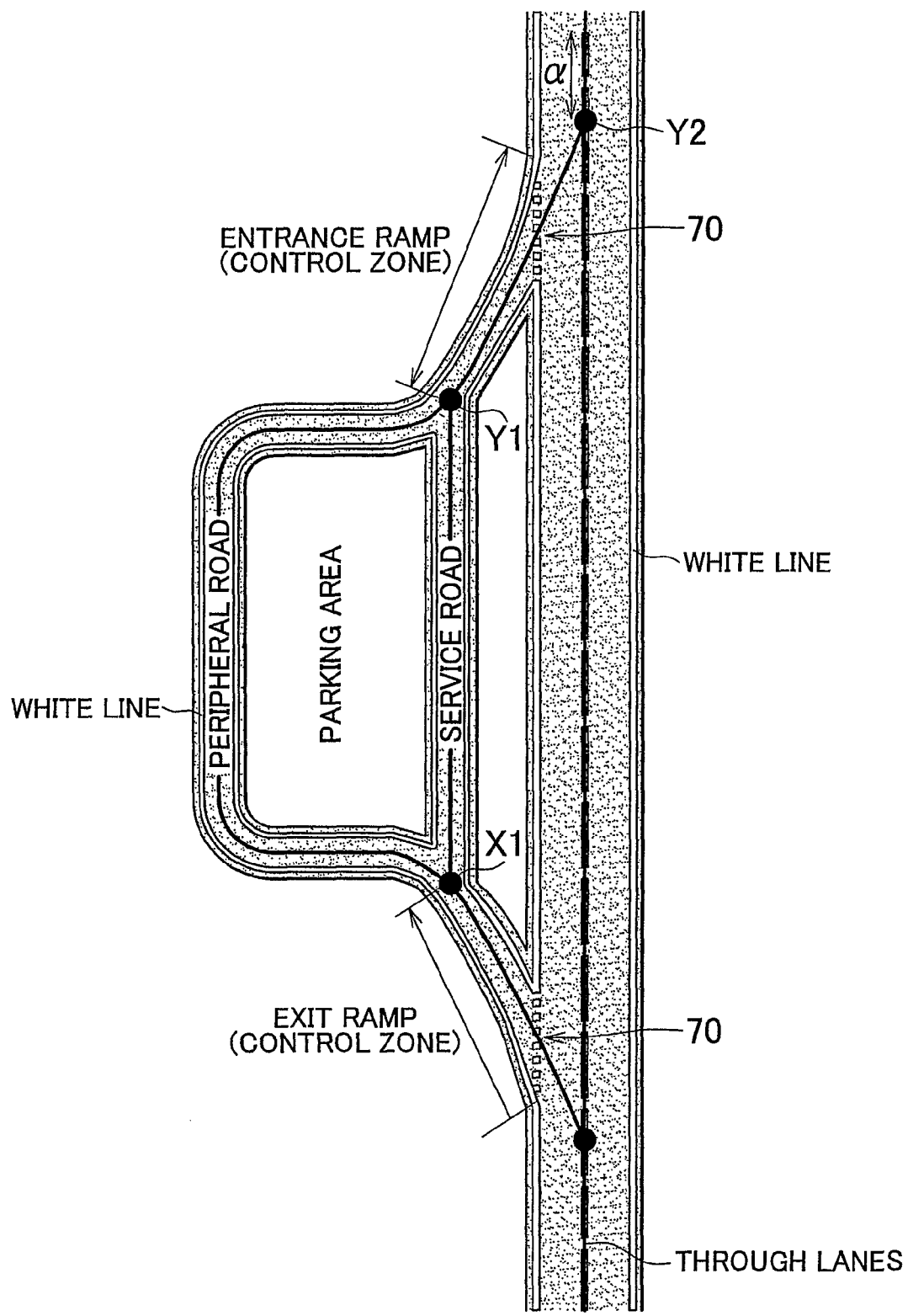
FIG. 4 is a plain view of a typical road shape of an exit ramp to and entrance ramp from a service area or parking area, in which the number of through lanes does not change before or after the exit point or merging point.

FIG. 4 is a plain view of a typical road shape of an exit ramp and an entrance ramp to/from a service area or parking area, in which the number of through lanes does not change before or after the exit point or merging point. The black circles in the drawing represent nodes relating to road information.

The exit ramp control start condition is satisfied when the back camera 12 captures an image of the broken line 70 when the host vehicle position is on a main road link related to a typical service area or parking area based on the map data, i.e., when the image processing device 16 recognizes a broken line in the image captured by the back camera 12 in a zone around a service area or parking area while the vehicle is traveling on a main road. This is because when the vehicle exits the main road to an exit ramp, the vehicle always crosses over the broken line 70 which is marked on the road at the exit ramp, as shown in FIG. 4, and divides the exit ramp from the main road.

The exit ramp control start condition may also include other conditions in addition to this condition of detecting broken line crossover. For example, the exit ramp control start condition may also be satisfied when (1) the back camera 12 captures an image of the broken line 70 on the road, and (2) the accelerator pedal is released. This is because there is no need to increase deceleration performance when the driver is depressing the accelerator pedal. Also, regarding the broken line crossover detection in (1), it is possible to more reliably detect that the vehicle is entering the exit ramp following broken line crossover by also taking into account, for example, the output of the steering sensor or whether or not a turn indicator is on.

The exit ramp control end condition may be satisfied when either (1) the host vehicle position has reached a branching point X1 of a peripheral road and a service road at the end of the exit ramp, or (2) the driver operates the accelerator pedal or the brake pedal on the exit ramp. In the case of (2), the driver is depressing the accelerator pedal or the brake pedal so it can be determined that the driver is adjusting the vehicle speed appropriately and thus there is no need for deceleration assist at this time. In the case of (2), the exit ramp control may be temporarily halted instead of being ended.

Therefore, in this example, the control zone of the exit ramp control extends from the position of the broken line 70 (or more accurately, the position of the vehicle when the image of the broken line 70 while traveling on the main road is recognized) to the branching position X1 of the peripheral road and the service road (more accurately, the position of the vehicle when the host vehicle position that is based on the GPS signal matches a connecting node X1 which connects the peripheral road link with the service road link based on the map data). The exit ramp control may also of course be ended when the host vehicle position that is based on the GPS signal reaches a predetermined distance before the branching point X1 based on the map data.

According to this example embodiment therefore, the vehicle control ECU 10 starts the exit ramp control after detecting that the vehicle has crossed over the broken line 70 which divides the exit ramp from the main road at a typical service area or parking area. As a result, the exit ramp control can be started at an appropriate timing. Also, by recognizing the image of the broken line 70, an appropriate control zone for the exit ramp control can be accurately set without being affected by positioning error or map information error (hereinafter referred to as "map error"). As a result, the exit ramp control is more reliable.

The entrance ramp control start condition is satisfied when the vehicle is traveling on a peripheral road or a service road of a service area or a parking area and the host vehicle position reaches a merging point Y1 (i.e., the point at which the entrance ramp starts) of the peripheral road and the service road on the entrance ramp side.

The entrance ramp control end condition is satisfied when the back camera 12 captures an image of the broken line 70 while the vehicle is traveling on the entrance ramp, i.e., when the image processing device 16 recognizes a broken line in the image captured by the back camera 12 while the vehicle is traveling on the entrance ramp. This is because when the vehicle merges from an entrance ramp onto a main road, the vehicle always crosses over the broken line 70 which divides the entrance ramp from the main road at the entrance ramp, as shown in FIG. 4.

The entrance ramp control end condition may also be satisfied when it can be determined that the host vehicle has passed through the merging point based on the map data and the host vehicle position that was detected by host vehicle position detecting means 28 for detecting the position of the host vehicle, even if an image of the broken line 70 is not captured by the back camera 12 when the vehicle is traveling on the entrance ramp. This is because the broken line 70 in the image captured by the back camera 12 may not always be recognized by the image processing device 16 depending on the state of the road, such as during rainy weather for example. In this example it is determined that the host vehicle has passed through the merging point and the entrance ramp control end condition thus satisfied when, for example, the host vehicle position reaches a predetermined distance $\alpha$ [m] after the position of the merging point Y2 (i.e., the connecting node Y2 which connects the entrance ramp link with the main road link) based on the map data. The predetermined distance $\alpha$ is appropriately determined according to the characteristics of the map error and the positioning error, and may be 70 [m] or less, for example.

Alternatively, the entrance ramp control may end immediately when it has been detected that the vehicle has changed lanes within the predetermined distance $\alpha$ [m] after passing through the connecting node Y2. This is because it can be more reliably confirmed that the vehicle has merged onto the main road by the lane change. This lane change may be detected based on the host vehicle position and the map data, or based on the image recognition results of an image captured by the back camera 12 or a front camera or the like.

Therefore, in this example, the control zone of the entrance ramp control extends from a connecting node Y1 which connects the peripheral road link with the service road link (more accurately, the position of the vehicle when the host vehicle position that is based on the GPS signal matches a connecting node Y1 which connects the peripheral road link with the service road link based on the map data) to a position of the broken line 70 at the end of the entrance ramp (or more specifically, the position of the vehicle when the image of the broken line 70 is recognized while traveling on the entrance ramp), a point a predetermined distance $\alpha$ from the connecting node Y2, or a point where it is detected that the vehicle has changed lanes (i.e., crossed over a lane marker) in the zone a predetermined distance $\alpha$ from the connecting node Y2.

According to this example embodiment therefore, the vehicle control ECU 10 ends the entrance ramp control after it has been detected that the vehicle has crossed over the broken line 70 which divides the entrance ramp from the main road at a typical service area or parking area. As a result, the entrance ramp control can be ended at an appropriate timing. Also, by recognizing the image of the broken line 70, an appropriate control zone for the entrance ramp control can be accurately set without being affected by positioning error or map error. As a result, the entrance ramp control is more reliable.

[Second Example Embodiment]

Figure 5:
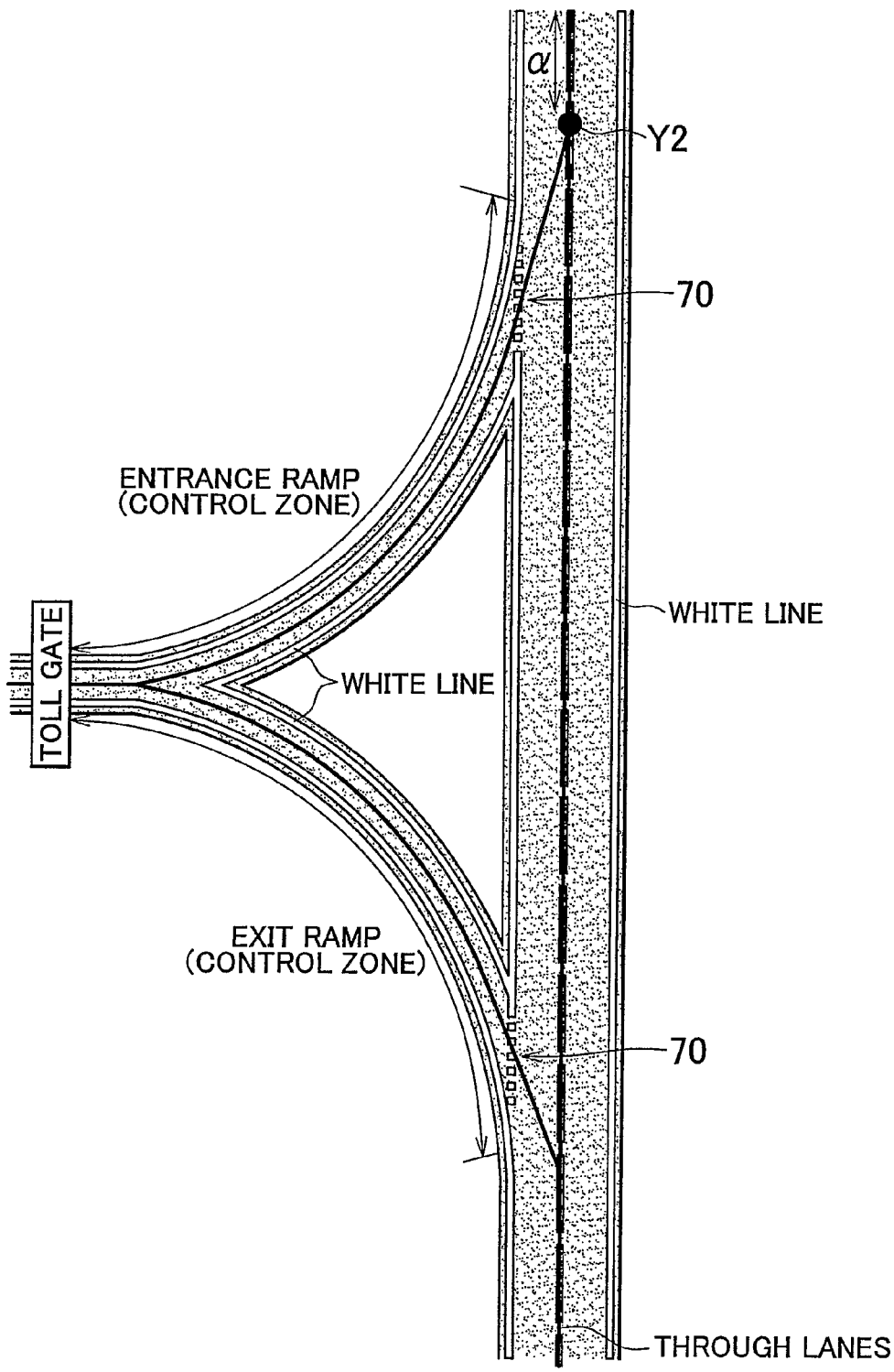
FIG. 5 is a plain view of a typical road shape of an exit ramp to and entrance ramp from an interchange, in which the number of through lanes does not change before or after the exit point or entrance point.

FIG. 5 is a plain view of a typical road shape of an exit ramp and an entrance ramp to/from an interchange in which the number of through lanes does not change before or after the exit point or the merging point. The black circle in the drawing represents a node relating to road information.

The exit ramp control start condition is satisfied when the back camera 12 captures an image of the broken line 70 in a zone near an interchange when the vehicle is traveling in a through lane while the host vehicle position is on a through lane link related to a typical interchange based on the map data, i.e., when the image processing device 16 recognizes a broken line in the image captured by the back camera 12 while the vehicle is traveling in a through lane. This is because when the vehicle exits the through lane onto an exit ramp, the vehicle always crosses over the broken line 70 which divides the exit ramp from the main road at the entrance ramp, as shown in FIG. 5.

The exit ramp control start condition may also include other conditions in addition to this condition of detecting broken line crossover. For example, the exit ramp control start condition may also be satisfied when (1) the back camera 12 captures an image of the broken line 70 on the road, and (2) the accelerator pedal is released. This is because there is no need to increase deceleration performance when the driver is depressing the accelerator pedal. Also, regarding the broken line crossover detection in (1), it is possible to more reliably detect that the vehicle is entering the exit ramp following broken line crossover by also taking into account, for example, the output of the steering sensor or whether or not a turn indicator is on.

The exit ramp control end condition is satisfied when either (1) the host vehicle position has reached the location of a toll gate at the end of the exit ramp (i.e., the position of a gate that divides a ordinary road from a toll road) or (2) the driver operates the accelerator pedal or the brake pedal on the exit ramp. In the case of (2), the driver is depressing the accelerator pedal or the brake pedal so it can be determined that the driver is adjusting the vehicle speed appropriately and thus there is no need for deceleration assist at this time. In the case of (2), the exit ramp control may be temporarily halted instead of being ended. Also, the condition of (1) may be detected based on vehicle speed information (the vehicle speed becomes zero while passing through the toll gate) and map data and the host vehicle position that is based on a GPS signal, or detected based on ETC (electronic toll collection) gate communication information.

Therefore, in this example, the control zone of the exit ramp control extends from the position of the broken line 70 (or more accurately, the position of the vehicle when the image of the broken line 70 is recognized while traveling on the main road) to the position of the gate that divides the ordinary road from the toll road (more accurately, the position of the vehicle when the host vehicle position that is based on the GPS signal matches a gate position that is based on the map data). The exit ramp control may also of course be ended when the host vehicle position that is based on the GPS signal reaches a predetermined distance before the gate position based on the map data.

According to this example embodiment therefore, the vehicle control ECU 10 starts the exit ramp control after it has been detected that the vehicle has crossed over the broken line 70 which divides the exit ramp from the main road at a typical interchange. As a result, the exit ramp control can be ended at an appropriate timing. Also, by recognizing the image of the broken line 70, an appropriate control zone for the exit ramp control can be accurately set without being affected by positioning error or map error. As a result, the exit ramp control is more reliable.

The entrance ramp control start condition is satisfied when the vehicle passes through the toll gate from a ordinary road. Passing through the toll gate may be detected based on vehicle speed information (the vehicle speed becomes zero while passing through the toll gate), or map data and the host vehicle position that is based on a GPS signal, or detected based on ETC (electronic toll collection) gate communication information.

The entrance ramp control end condition is satisfied when the back camera 12 captures an image of the broken line 70 while the vehicle is traveling on the entrance ramp, i.e., when the image processing device 16 recognizes a broken line in the image captured by the back camera 12 while the vehicle is traveling on the entrance ramp. This is because when the vehicle merges from an entrance ramp onto a main road, the vehicle always crosses over the broken line 70 which divides the entrance ramp from the main road at the entrance ramp, as shown in FIG. 5.

The entrance ramp control end condition may also be satisfied when it can be determined that the host vehicle has passed through the merging point based on the map data and the host vehicle position that was detected by the host vehicle position detecting means 28 for detecting the position of the host vehicle, even if an image of the broken line 70 is not captured by the back camera 12 when the vehicle is traveling on the entrance ramp. This is because the broken line 70 in the image captured by the back camera 12 may not always be recognized by the image processing device 16 depending on the state of the road, such as during rainy weather for example. In this example it is determined that the host vehicle has passed through the merging point and the entrance ramp control end condition thus satisfied when, for example, the host vehicle position reaches a predetermined distance $\alpha$ [m] after the position of the merging point Y2 (i.e., the connecting node Y2 which connects the entrance ramp link with the main road link) based on the map data. The predetermined distance $\alpha$ is appropriately determined according to the characteristics of the map error and the positioning error, and may be 70 [m] or less, for example.

Alternatively, the entrance ramp control may end immediately when it has been detected that the vehicle has changed lanes within the predetermined distance $\alpha$ [m] after passing through the connecting node Y2. This is because it can be more reliably confirmed that the vehicle has merged onto the main road by the lane change. This lane change may be detected based on the host vehicle position and the map data, or based on the image recognition results of an image captured by the back camera 12 or the like.

Therefore, in this example, the control zone of the entrance ramp control extends from the position of a gate that divides the ordinary road and the toll road (more accurately, the position of the vehicle when the host vehicle position that is based on the GPS signal matches the gate position that is based on the map data) to a position of the broken line 70 at the end of the entrance ramp (or more specifically, the position of the vehicle when the image of the broken line 70 is recognized while traveling on the entrance ramp), a point a predetermined distance $\alpha$ from the connecting node Y2, or a point where it is detected that the vehicle has, crossed over a lane marker in the zone a predetermined distance $\alpha$ from the connecting node Y2.

According to this example embodiment therefore, the vehicle control ECU 10 ends the entrance ramp control after it has been detected that the vehicle has crossed over the broken line 70 which divides the entrance ramp from the main road at a typical interchange. As a result, the entrance ramp control can be ended at an appropriate timing. Also, by recognizing the image of the broken line 70, an appropriate control zone for the entrance ramp control can be accurately set without being affected by positioning error or map error. As a result, the entrance ramp control is more reliable.

[Third Example Embodiment]

Figure 6:
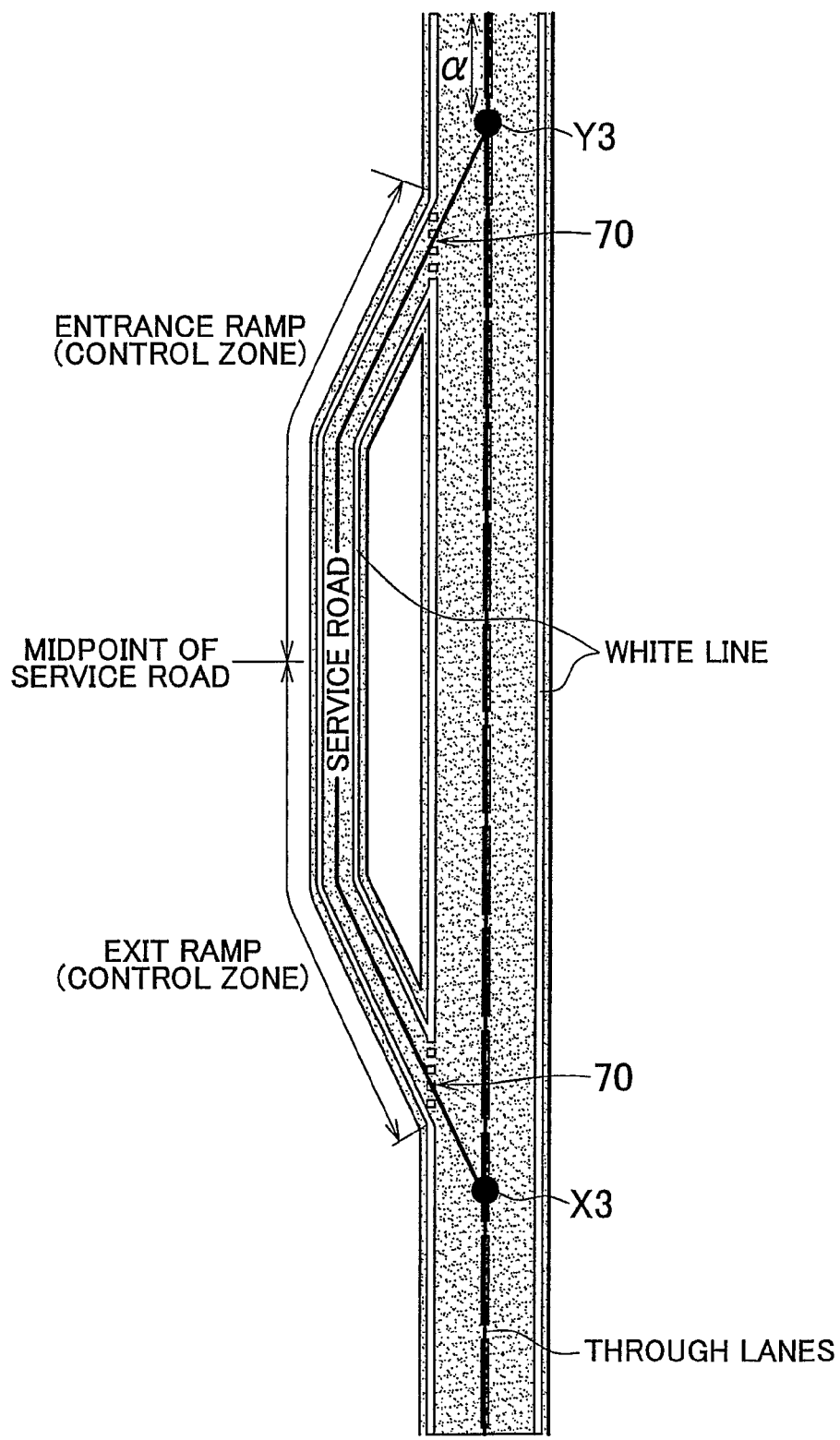
FIG. 6 is a plain view of a service road for a parking area in a particular case in which there is only a service road and not a peripheral road of a parking area due to the fact that the parking area is extremely narrow.

FIG. 6 is a plain view of a service road for a parking area in a particular case in which there is only a service road and not a peripheral road of a parking area due to the fact that the parking area is extremely narrow. The black circles in the drawing represent nodes relating to road information.

The exit ramp control start condition is satisfied when the back camera 12 captures an image of the broken line 70 while the vehicle position is on a main road link relating to a small parking area based on the map data, i.e., when the image processing device 16 recognizes a broken line in the image captured by the back camera 12 while the vehicle is traveling on a main road in a zone near a small parking area. This is because when the vehicle exits a main road onto an exit ramp, the vehicle always crosses over the broken line 70 which divides the exit ramp from the main road even on a service road, as shown in FIG. 6.

The exit ramp control start condition may also include other conditions in addition to this condition of detecting broken line crossover. For example, the exit ramp control start condition may also be satisfied when (1) the back camera 12 captures an image of the broken line 70 on the road, and (2) the accelerator pedal is released. This is because there is no need to increase deceleration performance when the driver is depressing the accelerator pedal. Also, regarding the broken line crossover detection in (1), it is possible to more reliably detect that the vehicle is entering the exit ramp following broken line crossover by also taking into account, for example, the output of the steering sensor or whether or not a turn indicator is on.

The exit ramp control end condition is satisfied when either (1) the host vehicle position has reached the midpoint of the service road or (2) the driver has operated the accelerator pedal or the brake pedal on the exit ramp (i.e., the first half of the service road). In the case of (2), the driver is depressing the accelerator pedal or the brake pedal so it can be determined that the driver is adjusting the vehicle speed appropriately and thus there is no need for deceleration assist at this time. The midpoint of the service road may be a midpoint based on the distance between connecting nodes X3 and Y3 of the service road link and the main road link. In the case of (2), the exit ramp control may be temporarily halted instead of being ended.

Therefore, in this example, the control zone of the exit ramp control extends from the position of the broken line 70 (or more accurately, the position of the vehicle when the image of the broken line 70 is recognized while traveling on the main road) to the midpoint of the service road (more accurately, the position of the vehicle when the host vehicle position that is based on the GPS signal matches the midpoint of the service road that is based on the map data). The exit ramp control may also of course be ended when the host vehicle position that is based on the GPS signal reaches a predetermined distance before the midpoint of the service road based on the map data.

According to this example embodiment therefore, the vehicle control ECU 10 starts the exit ramp control after it has been detected that the vehicle has crossed over the broken line 70 which divides the exit ramp from the main road at a unique small interchange. As a result, the exit ramp control can be ended at an appropriate timing. Also, by recognizing the image of the broken line 70, an appropriate control zone for the exit ramp control can be accurately set without being affected by positioning error or map error. As a result, the exit ramp control is more reliable.

The entrance ramp control start condition is satisfied when the vehicle position reaches the midpoint of the service road. The midpoint of the service road may similarly be detected based on map data and the host vehicle position that is based on a GPS signal.

The entrance ramp control end condition is satisfied when the back camera 12 captures an image of the broken line 70 while the vehicle is traveling on the entrance ramp (i.e., the latter half of the service road), i.e., when the image processing device 16 recognizes a broken line in the image captured by the back camera 12 while the vehicle is traveling on the entrance ramp. This is because when the vehicle merges from an entrance ramp onto a main road, the vehicle always crosses over the broken line 70 which divides the entrance ramp from the main road at the entrance ramp, as shown in FIG. 6.

The entrance ramp control end condition may also be satisfied when it can be determined that the host vehicle has passed through the merging point based on the map data and the host vehicle position that was detected by the host vehicle position detecting means 28 for detecting the position of the host vehicle, even if an image of the broken line 70 is not captured by the back camera 12 when the vehicle is traveling on the entrance ramp. This is because the broken line 70 in the image captured by the back camera 12 may not always be recognized by the image processing device 16 depending on the state of the road, such as during rainy weather for example. In this example, it is determined that the host vehicle has passed through the merging point and the entrance ramp control end condition thus satisfied when, for example, the host vehicle position reaches a predetermined distance $\alpha$ [m] after the position of the merging point (i.e., the connecting node which connects the entrance ramp link with the main road link) based on the map data. The predetermined distance $\alpha$ is appropriately determined according to the characteristics of the map error and the positioning error, and may be 70 [m] or less, for example.

Alternatively, the entrance ramp control may end immediately when it has been detected that the vehicle has changed lanes within the predetermined distance $\alpha$ [m] after passing through the connecting node Y3. This is because it can be more reliably confirmed that the vehicle has merged onto the main road by the lane change. This lane change may be detected based on the host vehicle position and the map data, or based on the image recognition results of an image captured by the back camera 12 or the like.

Therefore, in this example, the control zone of the entrance ramp control extends from the midpoint of the service road (more accurately, the position of the vehicle when the host vehicle position that is based on the GPS signal matches the midpoint of the service road that is based on the map data) to a position of the broken line 70 at the end of the entrance ramp (or more specifically, the position of the vehicle when the image of the broken line 70 is recognized while traveling on the entrance ramp), a point a predetermined distance $\alpha$ from the connecting node, or a point where it is detected that the vehicle has crossed over a lane marker in the zone a predetermined distance $\alpha$ from the connecting node.

According to this example embodiment therefore, the vehicle control ECU 10 ends the entrance ramp control after it has been detected that the vehicle has crossed over the broken line 70 which divides the entrance ramp from the main road at a unique small interchange. As a result, the entrance ramp control can be ended at an appropriate timing. Also, by recognizing the image of the broken line 70, an appropriate control zone for the entrance ramp control can be accurately set without being affected by positioning error or map error. As a result, the entrance ramp control is more reliable.

[Fourth Example Embodiment]

Figure 7:
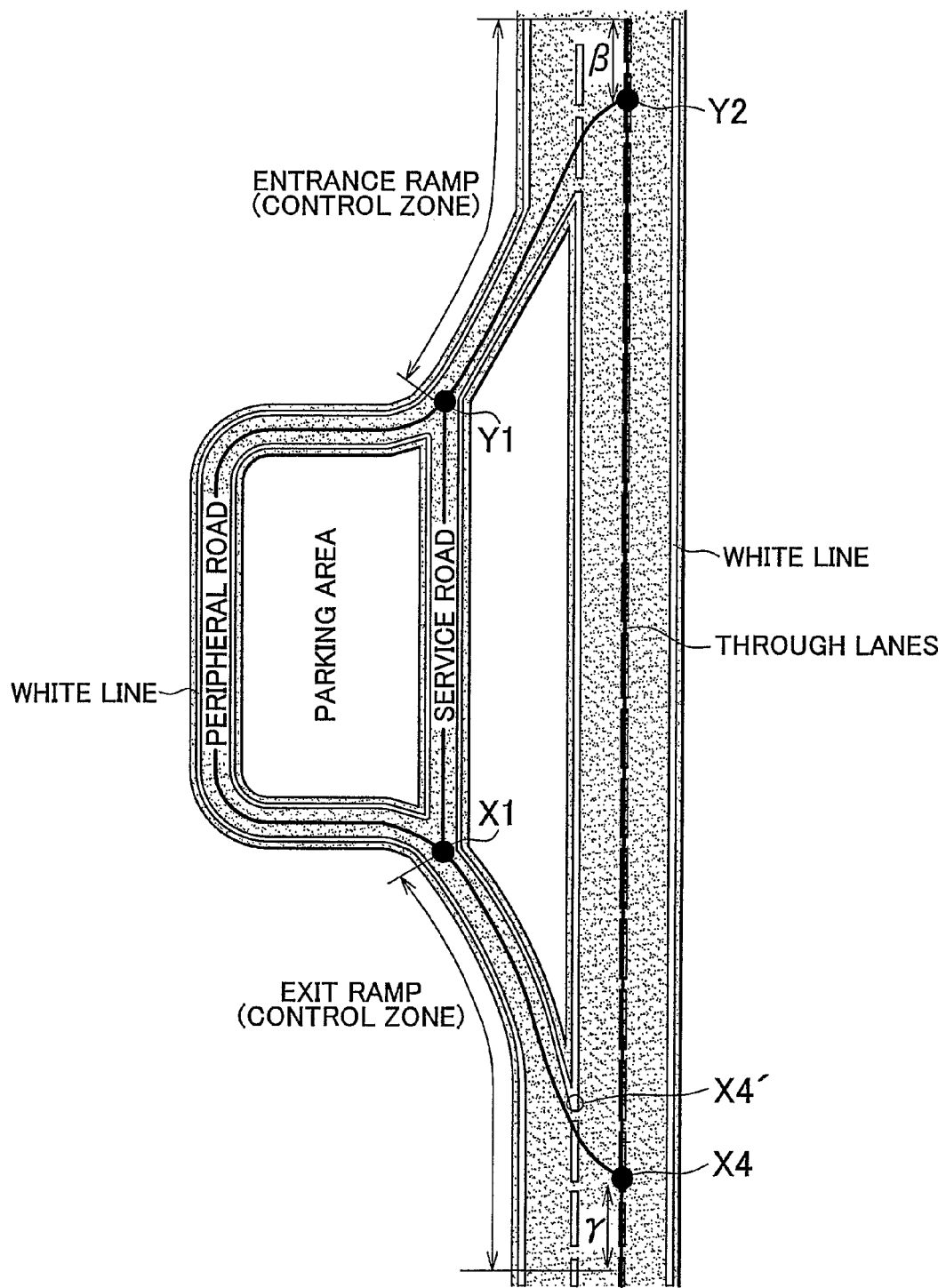
FIG. 7 is a plain view of a typical road shape of an exit ramp and an entrance ramp of a service area or a parking area, in which the number of through lanes increases and decreases before and after the exit point or entrance point.

FIG. 7 is a plain view of a road shape of an exit ramp and an entrance ramp of a service area or a parking area, in which the number of through lanes increases and decreases before and after the exit point or the merging point. The black circles in the drawing represent nodes relating to road information.

The exit ramp control start condition is satisfied when (1) the vehicle position is within $\gamma$ [m] of the connecting node X4 between the main road link and the exit ramp link when the vehicle position is on the main road link before a service area or a parking area based on the map data (when the vehicle is traveling in a through-lane or climbing lane when the service area or parking area is on the left side), and (2) the accelerator pedal has been released. This is because with the road shape shown in FIG. 7 there is no broken line 70 so the vehicle does not cross over the broken line 70 when exiting the main road to the exit ramp, which is different from the first example embodiment described above.

Another condition may also be added to the exit ramp control start condition. For example, taking into account the output from a steering sensor or whether a turn indicator is on and the like also makes it possible to more accurately detect when the vehicle has entered the exit ramp. Also, with a structure that enables the driving lane to be detected, the foregoing exit ramp control start condition may also be employed only when the driving lane is the leftmost lane (e.g., the climbing lane). This is because if the vehicle continues to travel in the leftmost lane, that vehicle must inevitably exit the main road onto the exit ramp.

The exit ramp control end condition is satisfied when (1) the vehicle position has reached the branching point X1 of a peripheral road and a service road at the end of the exit ramp, or (2) the driver operates the accelerator pedal or the brake pedal on the exit ramp. In the case of (2), the exit ramp control may be temporarily halted instead of being ended.

Therefore, in this example, the control zone of the exit ramp control extends from the point γ [m] before the connecting node X4 of the main road link and the exit ramp link to the branching position X1 of the peripheral road and the service road. The exit ramp control may also of course be ended when the host vehicle position that is based on the GPS signal reaches a predetermined distance before the branching point X1 based on the map data.

According to this example embodiment, exit ramp control is able to be started at an appropriate timing even if the broken line 70 is not detected at a service area or parking area where the vehicle can enter onto the exit ramp from the main road without crossing over the broken line. That is, according to this example embodiment, the vehicle control apparatus is also able to be used with such unique exit ramps while employing a basic structure that sets the control zone based on the broken line 70. As a result, exit ramp control is more reliable.

The entrance ramp control start condition is satisfied when the vehicle is traveling on a peripheral road or a service road of a service area or parking area and the vehicle position reaches a merging point Y1 (i.e., the point at which the entrance ramp begins) of the peripheral road and the service road on the entrance ramp side.

The entrance ramp control end condition is satisfied when the vehicle position reaches a location a predetermined distance β [m] after the position of the merging point Y2 (i.e., connecting node Y2 of the main road link and the entrance ramp link) that is based on the map data while traveling on the entrance ramp. This is because with the road shape shown in FIG. 7 there is no broken line 70 so the vehicle does not cross over the broken line 70 when merging from the entrance ramp onto the main road, which is different from the first example embodiment described above. That is, the vehicle is able to merge onto the main road from the service area or parking area without crossing over the broken line 70. This predetermined distance β is appropriately determined according to the characteristics of the map error and the positioning error, and may be 70 [m] or less, for example.

Alternatively, the entrance ramp control may end immediately when it has been detected that the vehicle has changed lanes within the predetermined distance β [m] after passing through the connecting node Y2. This is because the lane change makes it possible to more reliably confirm that the vehicle has merged onto the main road. This lane change may be detected based on the host vehicle position and the map data, or based on the image recognition results of an image captured by the back camera 12 or the like.

Therefore, in this example, the control zone of the entrance ramp control extends from the merging point Y1 of the peripheral road and the service road (more accurately, the position of the vehicle when the host vehicle position that is based on the GPS signal matches the connecting node Y1 of the peripheral road link and the service road link that is based on the map data) to a point a predetermined distance β from the connecting node Y2, or a point where it is detected that the vehicle has crossed over a lane marker in a zone a predetermined distance β from the connecting node Y2.

According to this example embodiment, entrance ramp control is able to be started at an appropriate timing even if the broken line 70 is not detected at a service area or parking area where the vehicle can enter an entrance ramp from the main road without crossing over the broken line. That is, according to this example embodiment, the vehicle control apparatus is also able to be used with such unique entrance ramps while employing a basic structure that sets the control zone based on the broken line 70. As a result, exit ramp control is more reliable.

In this example embodiment, regarding the exit ramp control start condition, as described above, it may be determined whether the host vehicle position is within γ [m] of the connecting node X4 of the exit ramp link and the main road link (i.e., the intersecting point X4 where the center lines of both roads meet). Alternatively, however, it may be determined whether the host vehicle position is within γ [m] of an actual point of intersection X4' of the exit ramp and the main road (i.e., the point where the dividing line on the sides of both roads meet or a point related thereto), as shown in FIG. 7. In this case, the position information of the point of intersection X4' (and its properties) is stored in the map information database 22.

[Fifth Example Embodiment]

Figure 8:
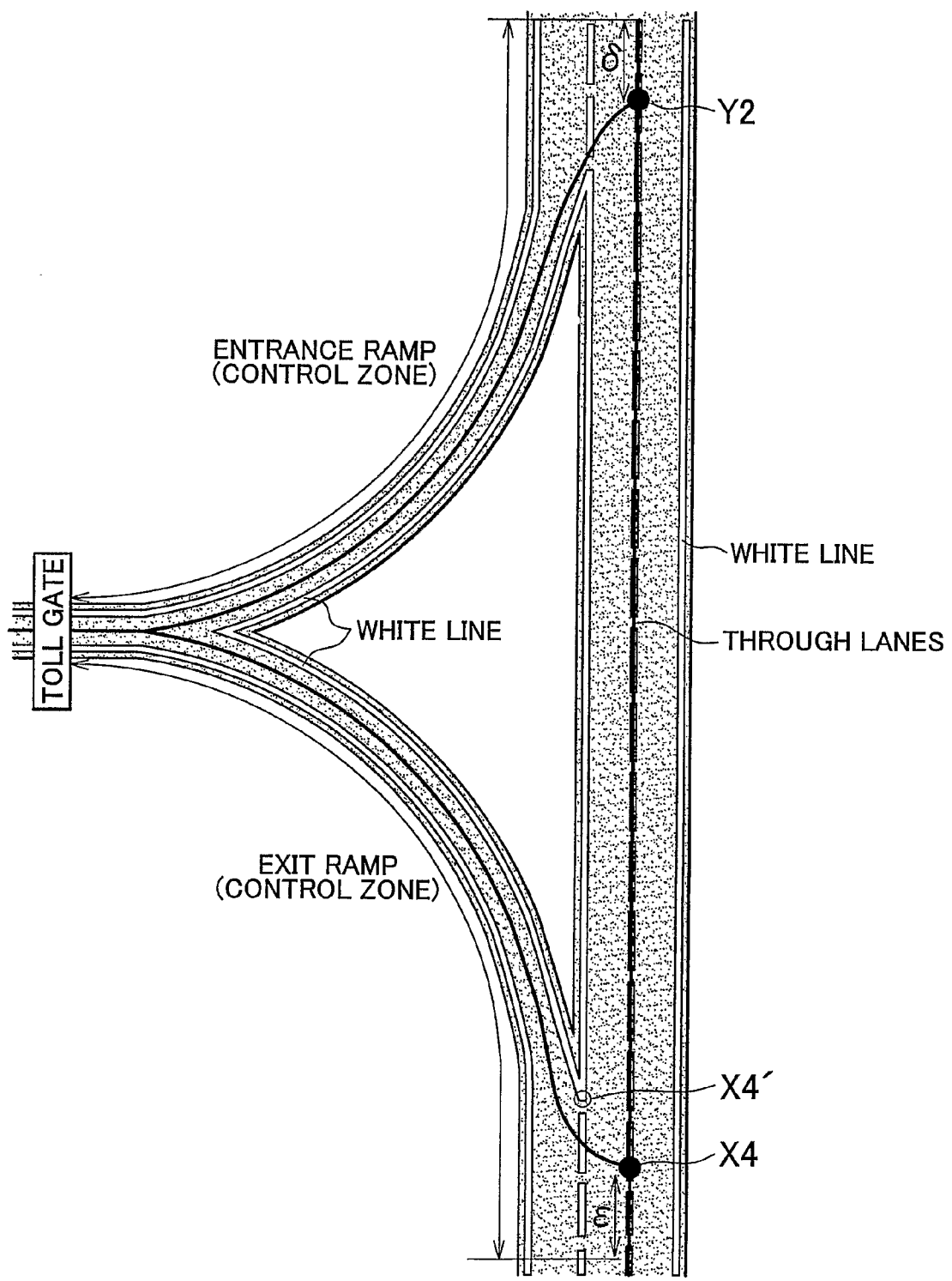
FIG. 8 is a plain view of a typical road shape of an exit ramp and an entrance ramp of an interchange, in which the number of through lanes increases and decreases before and after the exit point or entrance point.

FIG. 8 is a plain view of a road shape of an exit ramp and an entrance ramp of an interchange, in which the number of through lanes increases and decreases before and after the exit point or the merging point. The black circles in the drawing represent nodes relating to road information.

The exit ramp control start condition is satisfied when (1) the host vehicle position is within ε [m] of the connecting node X4 of the exit ramp and the main road when the host vehicle position is on the main road link before the interchange based on the map data (when the vehicle is traveling in a driving lane or climbing lane when the interchange is on the left side), and (2) the driver has released the accelerator pedal.

This is because with the road shape shown in FIG. 8 there is no broken line 70 so the vehicle does not cross over the broken line 70 when exiting the main road onto the exit ramp, which is different from the second example embodiment described above. That is, the vehicle is able to exit onto the exit ramp of the interchange without crossing over the broken line 70.

Another condition may also be added to the exit ramp control start condition. For example, taking into account the output from a steering sensor or whether a turn indicator is on and the like also makes it possible to more accurately detect when the vehicle has entered the exit ramp. Also, with a structure that enables the driving lane to be detected, the foregoing exit ramp control start condition may also be employed only when the driving lane is the leftmost lane (e.g., the climbing lane). This is because if the vehicle continues to travel in the leftmost lane, that vehicle must inevitably exit the main road onto the exit ramp.

The exit ramp control end condition is satisfied when either (1) the host vehicle position has reached the location of a toll gate at the end of the exit ramp (i.e., the position of a gate that divides a ordinary road from a toll road) or (2) the driver operates the accelerator pedal or the brake pedal on the exit ramp. In the case of (2), the driver is depressing the accelerator pedal or the brake pedal so it can be determined that the driver is adjusting the vehicle speed appropriately and thus there is no need for deceleration assist at this time. In the case of (2), the exit ramp control may be temporarily halted instead of being ended. Also, the condition of (1) may be detected based on vehicle speed information (the vehicle speed becomes zero while passing through the toll gate) or map data and the host vehicle position that is based on a GPS signal, or detected based on ETC (electronic toll collection) gate communication information.

Therefore, in this example, the control zone of the exit ramp control extends from a point ε [m] before the connecting node X4 of the main road link and the exit ramp link to the position of the gate that divides the toll road from the ordinary road. The exit ramp control may also of course be ended when the host vehicle position that is based on the GPS signal reaches a predetermined distance before the position of the gate that is based on the map data.

According to this example embodiment, exit ramp control is able to be started at an appropriate timing even if the broken line 70 is not detected at an interchange where the vehicle can enter onto the exit ramp from the main road without crossing over the broken line. That is, according to this example embodiment, the vehicle control apparatus is also able to be used with such unique exit ramps while employing a basic structure that sets the control zone based on the broken line 70. As a result, exit ramp control is more reliable.

The entrance ramp control start condition is satisfied when the vehicle passes through a toll gate from a ordinary road. Passing through the toll gate may be detected based on vehicle speed information (the vehicle speed becomes zero while passing through the toll gate) and map data and the host vehicle position that is based on a GPS signal, or detected based on ETC (electronic toll collection) gate communication information.

The entrance ramp control end condition is satisfied when the host vehicle position is a predetermined distance δ [m] after the position of the merging point Y2 (i.e., the connecting node Y2 that connects the main road link with the entrance ramp link) based on the map data while traveling on the entrance ramp. This is because with the road shape shown in FIG. 8 there is no broken line 70 so the vehicle does not cross over the broken line 70 when merging from the entrance ramp onto the main road, which is different from the second example embodiment described above. That is, the vehicle is able to merge onto the main road from the interchange without crossing over the broken line 70. This predetermined distance δ is appropriately determined according to the characteristics of the map error and the positioning error, and may be 70 [m] or less, for example.

Alternatively, the entrance ramp control may be immediately ended when a lane change is detected within a predetermined distance δ [m] after passing through the connecting node Y2 (i.e., when the host vehicle position is within the predetermined distance δ [m] from the connecting node Y2 on the main road link and a lane change from the leftmost lane to the second lane from the left is detected. This is because the lane change makes it possible to more reliably confirm that the vehicle has merged onto the main road. This lane change may be detected based on the host vehicle position and the map data, or based on the image recognition results of an image captured by the back camera 12 or the like.

Therefore, in this example, the control zone of the entrance ramp control extends from the position of the gate that divides a ordinary road from a toll road (more accurately, the position of the vehicle when the host vehicle position that is based on the GPS signal matches the gate position that is based on the map data) to a point a predetermined distance δ from the connecting node Y2, or a point where it is detected that the vehicle has crossed over a lane marker in a zone a predetermined distance δ from the connecting node Y2.

According to this example embodiment, entrance ramp control is able to be started at an appropriate timing even if the broken line 70 is not detected at an interchange where the vehicle can enter the main road from the entrance ramp without crossing over the broken line. That is, according to this example embodiment, the vehicle control apparatus is also able to be used with such unique entrance ramps while employing a basic structure that sets the control zone based on the broken line 70. As a result, entrance ramp control is more reliable.

In this example embodiment, regarding the exit ramp control start condition, it may be determined whether the host vehicle position is within ε [m] of the connecting node X4 of the exit ramp link and the main road link (i.e., the intersecting point where the center lines of both roads meet), as described above. Alternatively, however, it may be determined whether the host vehicle position is within ε [m] of an actual point of intersection X4' of the exit ramp and the main road (i.e., the point where the dividing line on the sides of both roads meet or a point related thereto), as shown in FIG. 8. In this case, the position information of the point of intersection X4' (and its properties) is stored in the map information database 22.

While the invention has been described in detail with reference to various example embodiments thereof, it is to be understood that the invention is not limited to those example embodiments. To the contrary, the invention is intended to cover various modifications and equivalent arrangements that are also within the spirit and scope of the invention.

For example, the foregoing example embodiments relate to driving assist control on an exit ramp or entrance ramp of a toll road. The invention is not limited to an exit ramp or entrance ramp of a toll road, however, and can be applied to any entrance ramp or exit ramp that is connected to a main road having a different safe cruising speed limit than the entrance ramp or the exit ramp such as an expressway, a motor highway, an intercity highway and the like.

Also, in the foregoing example embodiments, an image from the back camera 12 is used to detect when the vehicle crosses over a broken line. Alternatively, however, side cameras set facing downward in the left and right door mirrors can also be used to detect when the vehicle crosses over a broken line.

Further, in the foregoing example embodiments, broken line crossover is detected when the back camera 12 captures an image of the broken line 70. To achieve even greater accuracy, however, broken line crossover may also be detected when the lengthwise direction of the broken line 70 in the image is not aligned in the longitudinal direction of the image (i.e., when the lengthwise direction of the broken line 70 is essentially sideways or slanted sideways).

The invention claimed is:

1. A vehicle control apparatus of a vehicle which performs driving assist control on an entrance ramp or an exit ramp connected to a main road having a different safe cruising speed limit than the entrance ramp or the exit ramp, comprising:
 a broken line detecting device configured to detect a broken line which is marked on the road and divides the main road and the entrance ramp or the exit ramp, the broken line detecting device including a back camera mounted to a rear portion of a vehicle body, configured to capture an image of a road surface, and configured to detect a broken line over which the vehicle crosses as a broken line detection result; and
 a controller configured to determine a control zone of the driving assist control based on the broken line detection result from the broken line detecting device, wherein
 the driving assist control is a deceleration control that decelerates the vehicle when the driving assist control is performed on the exit ramp and the driving assist control is an acceleration control that accelerates the vehicle when the driving assist control is performed on the entrance ramp, the controller is configured to start the deceleration control when the broken line detecting device detects the broken line that divides the main road and the exit ramp, and the controller is configured to end the acceleration control when the broken line detecting device detects the broken line that divides the main road and the entrance ramp.

2. The vehicle control apparatus according to claim 1, wherein the controller is configured to start the deceleration control when the broken line detecting device detects the broken line that divides the main road and the exit ramp and an accelerator pedal is released.

3. The vehicle control apparatus according to claim 1, further comprising:

a host vehicle position detecting device configured to detect the position of a host vehicle; and a storage device configured to store map data including position information of a merging point of the entrance ramp, wherein the controller is configured to end the acceleration control when it can be determined, based on the map data and the host vehicle position detected by the host vehicle position detecting device, that the host vehicle has passed through the merging point, even if the broken line is not detected by the broken line detecting device.

4. The vehicle control apparatus according to claim 1, wherein the controller is configured to determine a starting point or an ending point of the control zone based on the position of the broken line detected by the broken line detecting device.

5. The vehicle control apparatus according to claim 1, wherein the controller is configured to set, as the control zone, a zone extending from the position of the broken line detected by the broken line detecting device to a branching position of a peripheral road and a service road.

6. The vehicle control apparatus according to claim 1, wherein the controller is configured to set, as the control zone, a zone extending from the position of the broken line detected by the broken line detecting device to a position of a gate which divides an ordinary road and a toll road.

7. The vehicle control apparatus according to claim 1, wherein the controller is configured to set, as the control zone, a zone extending from the position of the broken line detected by the broken line detecting device to a midpoint of a service road.

8. The vehicle control apparatus according to claim 1, wherein the controller is configured to halt or to end execution of the driving assist control when an acceleration or deceleration operation is detected within the control zone.

9. A vehicle control method of a vehicle for performing driving assist control on an entrance ramp or an exit ramp connected to a main road having a different safe cruising speed limit than the entrance ramp or the exit ramp, comprising:

detecting, using at least a back camera mounted to a rear portion of a vehicle body, a broken line that is marked on the road and that divides the main road and the entrance ramp or the exist ramp over which the vehicle crosses as a broken line detection result;

determining, using a vehicle control unit, a control zone of the driving assist control based on the broken line detection result;

performing, using a vehicle control unit, the driving assist control based on the control zone, the driving assist control is a deceleration control the decelerates the vehicle when the driving assist control is performed on the exit ramp and the driving assist control is an acceleration control that accelerates the vehicle when the driving assist control is performed on the entrance ramp;

starting the deceleration control, using the vehicle control unit, when the broken line detecting device detects a broken line that divides the main road and the exit ramp; and ending the acceleration control, using the vehicle control unit, when the broken line detecting device detects a broken line that divides the main road and the entrance ramp, wherein the detecting the broken line includes capturing an image of a road surface using the back camera.

10. The vehicle control method according to claim 9, wherein the deceleration control changes a control state of an engine or a transmission to increase deceleration performance of the vehicle.

11. The vehicle control method according to claim 9, wherein the acceleration control changes a control state of an engine or a transmission to increase acceleration performance of the vehicle.

12. The vehicle control apparatus according to claim 1, wherein the deceleration control is configured to change a control state of an engine or a transmission to increase deceleration performance of the vehicle.

13. The vehicle control apparatus according to claim 1, wherein the acceleration control is configured to change a control state of an engine or a transmission to increase acceleration performance of the vehicle.

\* \* \* \* \*